United States Patent Office 3,761,470
Patented Sept. 25, 1973

3,761,470
2-(4 - STYRYLPHENYL) - 2H-1,2,3-TRIAZOLE BRIGHTENERS, INTERMEDIATES THEREFOR AND COMPOSITIONS CONTAINING THE SAME
Albert F. Strobel and Maynard L. Whitehouse, Delmar, N.Y., assignors to GAF Corporation, New York, N.Y.
No Drawing. Filed June 17, 1970, Ser. No. 47,119
Int. Cl. C07d 55/02
U.S. Cl. 260—240 CA  7 Claims

ABSTRACT OF THE DISCLOSURE 2-(4-styrylphenyl)-2H-1,2,3-triazoles of the formula:

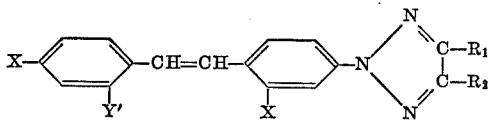

wherein $R_1$ is alkyl, benzyl or phenyl which may be substituted by halo, lower alkyl or lower alkoxy; $R_2$ is CN or $COX_1$ wherein $X_1$ is O alkyl, —O aryl or

wherein $R_4$ and $R_5$ are each independently selected from hydrogen, phenyl or alkyl which may be substituted by halo or lower alkoxy; and additionally $R_4$ and $R_5$ together form a 5- or 6-membered heterocyclic ring with the amido nitrogen atom; X is hydrogen, halo, CN, sulfonamide, mono and dialkyl and aryl substituted sulfonamide, alkyl sulfonyl or $COX_2$, wherein $X_2$ is the same as $X_1$ described above; Y and Y' are hydrogen and $OR_3$, one of Y and Y' being $OR_3$, wherein $R_3$ is alkyl or benzyl.

The triazoles are employed as brightening agents for resinous or plastic fibers, films, sheets, molded articles, etc., particularly polyamide fibers and films.

---

The present invention relates to novel derivatives of 2 - (4 - styrylphenyl) - 2H - 1,2,3 - triazoles, as well as novel intermediates for producing the same. In addition, the present invention relates to resinous or plastic compositions containing the triazole derivates in the form of fibers, films, sheets, molded articles, etc., the triazoles being present for fluorescing, optical bleaching or whitening properties.

Previously developed optical brighteners commonly employed with textiles and plastics, such as coumarins, the 2-(4-styrylphenyl)-2H-1,2,3 benzo and naptho-triazoles as exemplified by U.S. Pats. 2,718,054, 2,713,057, 2,784,183 and 2,784,184, benzoxazolyl, benzimidazolyl, and napthoylimide tend to develop a yellowish shade which cannot be removed by ordinary methods of bleaching or washing. The heretofore used methods of "bluing" white materials with blue pigments or fugitive blue dyestuffs have become quite obsolete and have been largely superseded by methods employing fluorescent optical bleaching agents or brighteners. These can be employed as additives to the soap or detergent or used in the dyebath, or in so-called melt incorporation in the plastic mass before shaping. The fluorescent optical bleaching agents perform their desired function by virtue of their characteristic absorption of ultra-radiation and subsequent conversion of this energy to light energy within the visible spectrum. This converted and emitted energy tends to neutralize any yellowness of the material and thereby increase the apparent whiteness thereof.

The present invention provides a novel class of compounds which are capable of imparting brightening properties to textiles and various plastics that heretofore could not be realized using previously developed brighteners. In addition to synthesizing new and useful 2-(4-styrylphenyl)-2H-1,2,3-triazoles, it has been discovered that such compounds provide exceptional brightening properties when compounded in the aforementioned products. Often referred to as optical brighteners, fluorescent bleaches or optical whitening agents, the compounds of the present invention, in addition to imparting lustrous properties to plastic sheets, films and fibers, are also useful when employed in molded or extruded products, to overcome yellow casts and to enhance clarity and brightness. The fluorescent optical bleaching agents of the present invention are particularly applicable as brightening agents for hydrophobic fibers such as polyamides and polyurethanes, and particularly for nylons and the like, it being understood that substantivity to any specific fiber is dependent to some extent on the substituents which are present.

The novel compounds of this invention are further distinguished by their ability to impart a high degree of brightness to sheets, fibers, films and molded articles produced from the above-mentioned plastics, and articles being characterized by high light fastness. They also have esthetically desirable hues, in the bluish range when utilized in such materials.

Therefore, an object of the invention is to provide new and useful fluorescent-optical brightening derivatives, i.e., derivatives of 2-(4-styrylphenyl) - 2H - 1,2,3 - triazoles, which impart exceptional optical whitening properties.

A further object of the present invention is to provide particularly beneficial and useful compositions containing the optical brighteners with hydrophobic fibers and films, such as polyamides, polyurethanes and the like.

An additional object of the present invention is to provide novel intermediate diazo-aminostilbenes.

Still further objects of the present invention will become more apparent from the following more detailed description thereof.

The compounds of the present invention are 2-(4-styrylphenyl) - 2H - 1,2,3 - triazoles characterized by the formula:

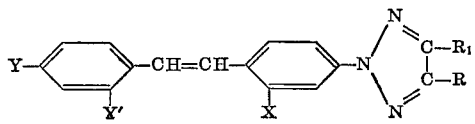

wherein $R_1$ is alkyl, benzyl or phenyl which may be substituted by halo, lower alkyl or lower alkoxy; $R_2$ is CN or $COX_1$ wherein $X_1$ is O alkyl, —O aryl or

wherein $R_4$ and $R_5$ are each independently selected from hydrogen, phenyl or alkyl which may be substituted by halo or lower alkoxy; and additionally $R_4$ and $R_5$ may together form a 5- or 6-membered heterocyclic ring with the amido nitrogen atom; X is hydrogen, halo, CN, sulfonamide, mono and dialkyl and aryl substituted sulfonamide, alkyl sulfonyl or $COX_2$, wherein $X_2$ is the same as $X_1$ described above; Y and Y' are hydrogen and $OR_3$, one of Y and Y' being $OR_3$, wherein $R_3$ is alkyl or benzyl.

More particularly, the compounds of the present invention in accordance with the above formula can be represented as follows:

Wherein $R_1$ is $C_{1-18}$ alkyl, benzyl or phenyl which may be substituted by substituents such as chloro, bromo, fluoro, methyl, methoxy, ethoxy, propoxy or butoxy; $R_2$ is CN or $COX_1$ wherein $X_1$ is $C_{1-18}$ alkoxy, benzyloxy or phenoxy; $X_1$ may also be

wherein $R_4$ and $R_5$ may be hydrogen, phenyl or $C_{1-18}$ alkyl which may be substituted by chloro, bromo and fluoro, methoxy, ethoxy, propoxy, and butoxy; additionally $R_4$ and $R_5$ taken together with the amido nitrogen atom may be morpholino, piperidino or pyrrolo; X is hydrogen, chloro, bromo, fluoro, CN, sulfonamide, monoethyl or dimethyl substituted sulfonamide, monophenyl substituted sulfoamide or methylsulfonyl or $COX_2$, wherein $X_2$ has the same values as $X_1$ described above; Y and Y' are hydrogen or $OR_3$, one of Y and Y' being $OR_3$, wherein $R_3$ is $C_{1-18}$ alkyl or benzyl.

In the aforementioned formula, alkyl includes, but is not intended to be limited by, the following groups:

| | |
|---|---|
| methyl | heptyl |
| ethyl | octyl |
| propyl | iso-octyl |
| butyl | undecyl |
| sec-butyl | tetradecyl |
| t-butyl | heptadecyl |
| pentyl | octadecyl, etc. |
| hexyl | |

Included within the term alkoxy are:

| | |
|---|---|
| methoxy | tert-butoxy |
| ethoxy | pentoxy |
| propoxy | hexoxy |
| butoxy | heptadecoxy |
| sec-butoxy | octadecoxy, etc. |

The compounds of the present invention are prepared by diazotizing a 4-aminostilbene having the formula:

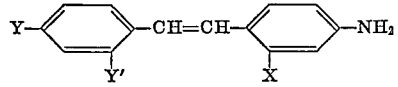

and coupling the diazotized 4-aminostilbene in conventional manner with an approximately molar equivalent up to about 10% excess of a compound having the formula:

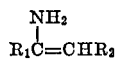

(wherein the variables have the same meaning as described above) to prepare an intermediate compound of the formula:

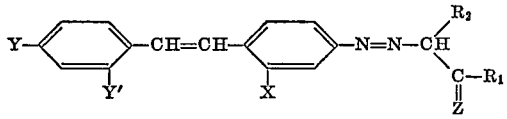

wherein Z represents an imide group, or if hydrolysis occurs, the hydrolysis product of the imide, or an oxygen atom.

In practice, compounds wherein $R_2$ is an amide group are frequently not employed as the coupler, but rather the corresponding nitrilo compound is employed with subsequent conversion to the amide after ring closure. Similarly, the corresponding carboxylic acid ester may be employed, and this then converted to the amide after ring enclosure.

If hydrolysis of the imide has occurred, the azo dye is then reconverted to the imide by passage of ammonia into a solution of the dyestuff in a suitable solvent, such as pyridine, picoline, dimethylformamide and the like.

Ring closure is then carried out in the usual manner for the production of triazoles, for example, by treating with a cupric salt in a solvent such as pyridine, picoline or dimethylformamide, precipitating the copper salt as the sulfide, filtering and then isolating the product in any convenient manner.

In carrying out this series of reactions, the intermediate products may be isolated if desired, but it has not been found necessary and the series of reactions can be carried through to the final brightening agent. Since the intermediate products are useful as dyestuffs and brighteners also, isolation is often desirable.

The following compounds are representative of the 4-aminostilbenes useful in accordance with the present invention:

4-amino-4'-methoxystilbene
4-amino-4'-ethoxystilbene
4-amino-4'-propoxystilbene
4-amino-4'-t-butoxystilbene
4-amino-4'-(1,1,3,3-tetramethylbutoxy)stilbene
4-amino-4'-n-octyloxystilbene
4-amino-4'-dodecyloxystilbene
4-amino-4'-hexadecyloxystilbene
4-amino-4'-octadecyloxystilbene
4-amino-2-chloro-4'-methoxystilbene
4-amino-2-bromo-4'-ethoxystilbene
4-amino-2-fluoro-4'-methoxystilbene
4-amino-2-cyano-4'-methoxystilbene
4-amino-2-carbethoxy-4'-methoxystilbene
4-amino-2-(N-methylcarbamoyl)-4'-methoxystilbene
4-amino-2-(N,N-dimethylcarbamoyl)-4'-methoxystilbene
4-amino-2-(N,N-dibutylcarbamoyl)-4'-methoxystilbene
4-amino-2-(morpholinocarbonyl)-4'-methoxystilbene
4-amino-2-(piperidinocarbonyl)-4'-methoxystilbene
4-amino-2-(N-methylsulfamoyl)-4'-methoxystilbene
4-amino-2-(N,N-dimethyl)-4'-methoxystilbene
4-amino-2-(N,N-dibutylsulfamoyl)-4'-methoxystilbene
4-amino-2-(N-chloroethylcarbamoyl)-4'-methoxystilbene
4-amino-2-(N-methoxyethylcarbamoyl)-4'-methoxystilbene
4-amino-2'-methoxystilbene
4-amino-2'-ethoxystilbene
4-amino-2'-n-butoxystilbene
4-amino-2'-n-octyloxystilbene
4-amino-2'-dodecyloxystilbene
4-amino-2-chloro-2'-methoxystilbene, etc.

Such 4-aminostilbenes can be prepared by methods well known in the art.

Representatives of the compounds which may be used that fall within the formula:

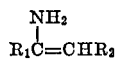

are:

3-aminocrotononitrile
3-amino-2-pentenonitrile
3-amino-2-heptenonitrile
3-amino-2-undecenonitrile
3-amino-2-pentadecenonitrile
3-amino-2-heptadecenonitrile
3-amino-3-phenylacrylonitrile
3-amino-4-phenylcrotononitrile
β-aminocrotonic acid, methyl ester
β-aminocrotonic acid, ethyl ester
β-aminocrotonic acid, butyl ester
β-aminocrotonic acid, octyl ester
β-aminocrotonic acid, dodecyl ester
β-aminocrotonic acid, octadecyl ester
β-amino-N-methylcrotonylamide
β-amino-N-dimethylcrotonylamide
β-amino-N-ethylcrotonylamide
β-amino-N-isopropylcrotonylamide
β-amino-N,N-dibutylcrotonylamide
β-amin-N-octylcrotonylamide
β-amino-N-dodecylcrotonylamide
β-amino-N-octadecylcrotonylamide
β-amino-N-chloroethylcrotonylamide
β-amino-N-methoxyethylcrotonylamide
β-aminocrotonomorpholide
β-aminocrotonopiperidide, etc.

The β-aminoacrylonitriles and β-aminocrotononitriles are well known compounds. For example, French Pat. 1,377,891 (CA 62, 9021g) describes the preparation of diacetonitrile (β-aminocrotononitrile) by treating acetonitrile with sodium and the hydrolyzing. In the Journal of the American Chemical Society 64, 152, preparations are given for β-aminoacrylonitriles wherein the 3-carbon atom is substituted by alkyl groups of various chain lengths or by benzyl. Chemische Berichte 82, 254–7 describes nitriles wherein $R_1$ is aryl. The β-aminoacrylonitrile and crotononitrile compounds are readily converted by hydrolysis to the corresponding keto derivatives (Chem. Ber. ibid) and by simple chemistry to the corresponding esters and amides.

As indicated above, the optical brightening agents of the invention are advantageously used in compositions, particularly polyamide and polyurethane fibers, films, sheets, molded articles, etc. Included among the hydrophobic fibers and films are polyurethanes, polyacrylonitriles and the nylons which are long-chain polyamides having recurring amide groups as an integral part of the main polymer chain. Included are nylons based on caprolactam such as nylon 6 and nylon 8. The brightening agents of this invention may also be employed with pyrrolidone nylon, such as nylon 4, and those made by condensing hexamethylenediamine with adipic acid or sebacic acid commonly known as nylon 66 and nylon 610. The products of this invention are also valuable brightening agents for a wide variety of polyurethanes, characterized as reaction products of isocyanates with hydroxyl-containing compounds, e.g., polyester and polyether based polyurethanes.

Compositions employing the bleaching agents disclosed herein may be made according to conventional processes known in the art and require no special methods or techniques to assure the desired results. The brightening agent may simply be incorporated into a melt to be used in the formation of fibers and films, as well as molded and extruded products. The novel brighteners of the invention should be used in compositions in an amount or proportional range which effectively produces the most desirable result. The generally effective fluorescing range is from about 0.005% to about 1% of the weight of the polymer.

The following examples illustrate the present invention, but are not intended to be limitative thereof.

EXAMPLE 1

Preparation of the compound having the formula:

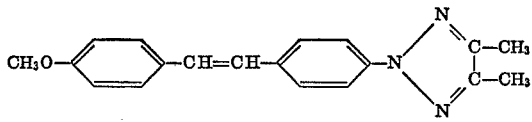

Some 163.2 g. 4-amino-4'-methoxystilbene (0.725 mole), 350 cc. water and 186 cc. concentrated hydrochloric acid were mixed and stirred for one hour on a steam bath after which time the mixture was cooled externally to 15–20° C,. then 132.5 cc. sodium nitrite solution (38.5% wt./vol.) were added. After stirring 2 hours at 15–20° C. excess nitrite was destroyed by treatment with dilute aqueous sulfamic acid solution. This solution was then added to a mixture of 2000 cc. picoline, 112.5 cc. water and 62.4 g. 3-aminocrotononitrile (0.76 mole). After stirring overnight at room temperature, the mixture was filtered, washed with 1–2 l. water, and dried, yielding 195.4 g. of the dyestuff having the formula:

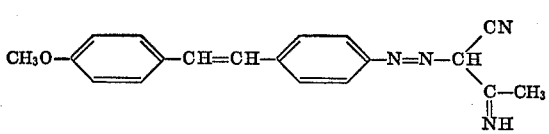

Some 0.319 moles of this product were heated with 2700 cc. picoline and 107 g. cupric chloride for 3 hours with stirring. The mixture was cooled, and the copper salts precipitated with sodium sulfide flakes. The resulting slurry was filtered, the picoline distilled off and the residue cooled and filtered. The filter cake was recrystallized from isopropanol after treatment with activated charcoal to yield the desired product having a M.P. 195.8–198.2° C. The product had a $K_{max}$=149.6 at m$\mu$.

Calculated for $C_{19}H_{16}N_4O$ (percent): C, 72.18; H, 5.10; N, 17.72. Found (percent): C, 72.51 and 72.51; H, 5.31 and 5.28; N, 18.18 and 18.07.

EXAMPLE 2

Preparation of the compound having the formula:

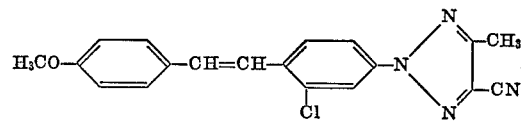

Example 1 was repeated at one-tenth of the concentrations, except that 0.0725 mole 4-amino-2-chloro-4'-methoxystilbene replaced the 4-amino-4'-methoxystilbene employed in Example 1 to produce the intermediary dye having the formula:

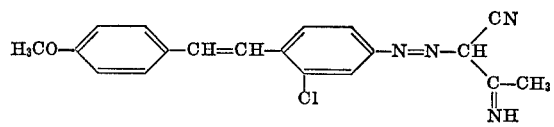

Some 0.058 mole of this product were heated with 500 cc. picoline and 19.5 g. cupric chloride for 3 hours with stirring. The mixture was cooled, and the copper salts precipitated with sodium sulfide flakes. The resulting slurry was filtered, the picoline distilled off, and the residue cooled and filtered. The filter cake was recrystallized from dimethylformamide after treatment with activated charcoal to yield a product having a M.P. 189.2–190.0° C., and a $K_{max}$=116.5 at 346 m$\mu$.

Calculated for $C_{19}H_{15}ClN_4O$ (percent): C, 65.00; H, 4.31; N, 15.98. Found (percent): C, 64.26 and 64.26; H, 4.33 and 4.33; N, 16.20 and 16.20.

EXAMPLE 3

Application of the dyestuff of Example 1 in a nylon melt

Some 0.001 part of the compound of Example 1 were dissolved in a small amount of benzene and mixed well with nylon 6 (ε-caprolactam) pellets. The solvent was evaporated by gentle heating. The mix was then melted in a nitrogen atmosphere, stirred well and allowed to cool in a mold. The resulting molded product was found to possess superior brightness and also light fastness in comparison with a similar mold article which did not contain the brightener and also in comparison with similar molded articles which contained the commercially available brighteners having the formulae:

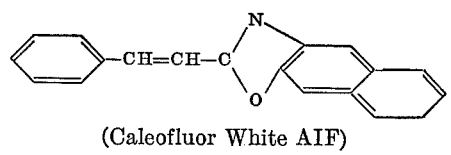

(Calcofluor White AIF)

and

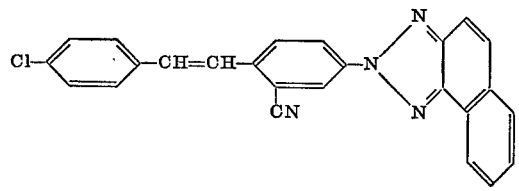

PE-79

EXAMPLE 4

Application in dyeing nylon fiber

Some 50 mg. of the product of Example 1 were dissolved in 100 ml. dimethylformamide with slight warming, then 2 ml., 5 ml. and 10 ml. of the above solution were mixed with 148 ml., 145 ml. and 140 ml., respectively, of a 0.1% solution of Peregal O (polyoxyethylated fatty acid alcohol) to produce 0.02%, 0.05% and 0.10% dyeing o.w.f., respectively. Then 10 g. swatches of nylon taffeta #200 were placed into the dyeing mixtures which were placed on a water bath at 150° F. The bath was raised to the boil and maintained at that temperature for 45 minutes. The materials were rinsed 3 times in luekwarm water and dried. The dyeings which contained the product of Example 1 showed superior brightness and also light fastness after 2 hours exposure to UV light (carbon arc) than a similar swatch not having the brightener. The above dyeings were also superior in brightness and light fastness to similar dyeings made employing the commercial brighteners described in Example 3.

EXAMPLE 5

Preparation of the compound having the formula:

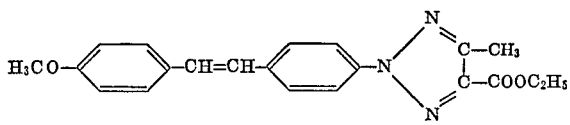

Some 19.57 g. of 4-amino-4'-methoxystilbene (0.087 mole), 40 cc. water and 22.5 cc. concentrated hydrochloric acid were mixed and stirred for one hour on a steam bath after which time the mixture was cooled externally to 15–20° C. Then 16 cc. sodium nitrite solution (38.5% wt./vol.) were added. After stirring for 2 hours at 20–25° C., excess nitrite was destroyed with dilute aqueous sulfamic acid. This diazo mixture was then added to a mixture of 300 cc. picoline, 135 cc. water and 11.8 g. β-aminocrotonic acid, ethyl ester (0.0913 mole). The charge was stirred overnight at room temperature after which it was filtered, the filter cake washed with water and dried to give 28.2 g. of the dyestuff having the formula:

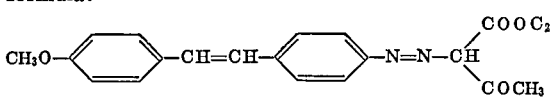

Calculated for $C_{21}H_{22}N_2O_4$ (percent): C, 68.85; H, 6.05; N, 7.65. Found (percent): C, 69.31 and 69.38; H, 6.20 and 6.20; N, 7.87 and 7.98. $K_{max}$=101.5 at 400 m$\mu$. M.P.=130.4–133.6° C.

Then 0.0682 mole of this product were dissolved in 500 cc. picoline and then gaseous ammonia was passed into the solution at room temperature and at atmospheric pressure for 13 hours. Excess ammonia and solvent were then stripped off under reduced pressure to yield a mixture of the dyestuff having the formula:

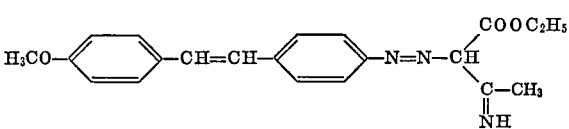

together with some of the initial keto azo dye.

Then 14.6 g. (about 0.04 mole) of this mixture of intermediates were added to 300 cc. picoline containing 0.1 mole anhydrous cupric chloride. The charge was heated to 90° C. for 3 hours, then cooled to 80° C., and the copper salts precipitated with sodium sulfide flakes. The resulting slurry was clarified, the picoline distilled off, and the residue cooled and filtered. The filter cake was recrystallized from dimethyl formamide after treatment with activated charcoal to yield the desired product.

Calculated for $C_{21}H_{21}N_3O_3$ (percent): C, 69.50; H, 5.82; N, 11.58. Found (percent): C, 69.63 and 69.63; H, 5.88 and 5.98; N, 11.74 and 11.74. $K_{max}$=136.0 at 342 m$\mu$. M.P.=153.6–154.4° C.

This product was applied to nylon in the manners of Examples 3 and 4 yielding a nylon mold and nylon fiber dyeings which have outstanding brightness in combination with excellent light fastness.

EXAMPLE 6

Preparation of the compound having the formula:

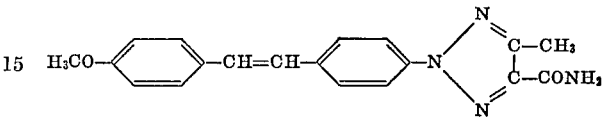

Some 10.9 g. (0.03 mole) of the compound of Example 5 were slurried in a solution composed of 170 cc. dimethyl formamide and 30 cc. aqueous ammonia (29% $NH_3$). The charge was refluxed gently for 6 hours, after which it was cooled to 0° C. and the solid filtered off to give the desired product having a $K_{max}$=143.9 at 339 m$\mu$, M.P. 282.0–284.5° C.

Calculated for $C_{19}H_{18}N_4O_2$ (percent): C, 68.20; H, 5.42; N, 16.76. Found (percent): C, 69.15 and 69.15; H, 5.81 and 5.78; N, 16.62 and 16.62.

EXAMPLE 7

Preparation of the compound having the formula:

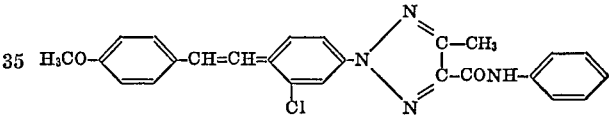

Example 5 was repeated with the exception that in place of the β-aminocrotonic acid, ethyl ester, 0.0913 mole β-aminocrotonanilide were employed and in place of the 4-amino-4'-methoxystilbene approximately 0.087 mole 4-amino-2-chloro-4'-methoxystilbene were used. Otherwise the reaction was similar to that of Example 5.

The product thus obtained dyed nylon fiber and nylon in the mold giving an outstanding bright coloration having excellent fastness to light.

EXAMPLE 8

Preparation of the product having the formula:

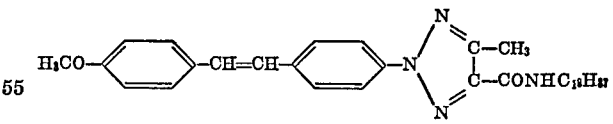

Some 0.1 mole of the product of Example 5 was combined with approximately 0.3 mole stearylamine and heated at 145–150° C. for 24 hours with stirring. This product was then leached with 5 times its weight of methylene chloride, filtered, washed with alcohol and dried to give a brightener having the above formula.

The product thus obtained dyed nylon fiber and nylon in the mold giving an outstanding bright coloration having excellent fastness to light.

EXAMPLES 9–19

The following compounds which have the formula:

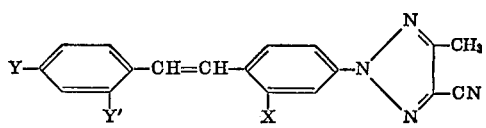

were prepared in the manner of Example 1, wherein Y, Y' and X have the following meanings:

| Example: | Y | Y' | X |
|---|---|---|---|
| 9 | H | OCH₃ | H |
| 10 | H | OCH₃ | Cl |
| 11 | OCH₃ | H | CN |
| 12 | OCH₃ | H | CONH₂ |
| 13 | OCH₃ | H | SO₂NH₂ |
| 14 | OCH₃ | H | SO₂CH₃ |
| 15 | OCH₃ | H | SO₂N(CH₃)₂ |
| 16 | H | OCH₃ | SO₂N(CH₃)₂ |
| 17 | OCH₃ | H | SO₂NHC₂H₅ |
| 18 | OCH₃ | H | COOC₂H₅ |
| 19 | OCH₃ | H | SO₂NHC₆H₅ |

These compounds all show excellent brightening properties.

EXAMPLES 20–30

The compounds of Examples 20–30 which have the following formula are produced in the manner of Example 5, the compounds likewise having excellent brightening properties.

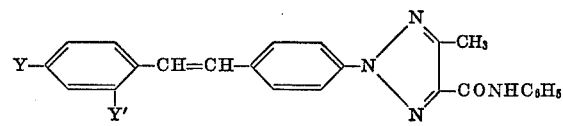

| Example: | Y | Y' | X |
|---|---|---|---|
| 20 | H | OCH₃ | H |
| 21 | H | OCH₃ | Cl |
| 22 | OCH₃ | H | CN |
| 23 | OCH₃ | H | CONH₂ |
| 24 | OCH₃ | H | SO₂NH₂ |
| 25 | OCH₃ | H | SO₂CH₃ |
| 26 | OCH₃ | H | SO₂N(CH₃)₂ |
| 27 | H | OCH₃ | SO₂N(CH₃)₂ |
| 28 | OCH₃ | H | SO₂NHC₂H₅ |
| 29 | OCH₃ | H | COOC₂H₅ |
| 30 | OCH₃ | H | SO₂NHC₆H₅ |

EXAMPLES 31–43

Further compounds were prepared in the manner of Example 1 showing improved brightening properties:

Having now described the invention in specific detail and indicated the manner in which it may be carried into practice, it will be readily apparent to those skilled in the art that innumerable variations, applications and extensions of the basic principles involved may be made without departing from its spirit and scope. The present invention is, therefore, only intended to be limited in accordance with the appended claims.

What is claimed is:

1. A compound of the formula:

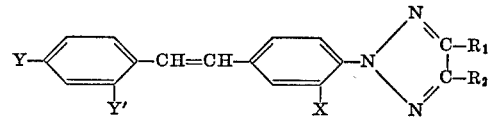

wherein $R_1$ is alkyl, benzyl or phenyl, which may be substituted by halo, lower alkyl or lower alkoxy; $R_2$ is CN or $COX_1$ wherein $X_1$ is —O alkyl, —O phenyl or $$yN\begin{matrix}R_4\\R_5\end{matrix}$$

$R_4$ and $R_5$ are each independently selected from hydrogen, phenyl and alkyl, which can be substituted by halo or lower alkoxy, and $R_4$ and $R_5$ together may form a heterocyclic ring with the amido nitrogen atom selected from the group of morpholino, piperidino and pyrrolidino; X is hydrogen, halo, CN, sulfonamide, mono- or dialkyl- or phenyl substituted sulfonamides, alkyl-sulfonyl, —O alkyl, —O phenyl, —O benzyl or $COX_2$, wherein $X_2$ is the same as $X_1$; Y and Y' are each selected from hydrogen and $OR_3$, one of Y and Y' being $OR_3$, wherein $R_3$ is alkyl or benzyl.

2. The compound according to claim 1 having the formula:

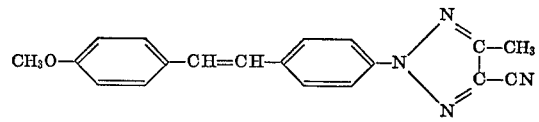

| Example | Y | Y' | X | R₁ | R₂ |
|---|---|---|---|---|---|
| 31 | —O—C₆H₁₃ | H | Br | C₆H₁₃ | —COOC₁₆H₃₃ |
| 32 | —O—C₂₅H₂₅ | H | Br | C₁₁H₂₃ | —COOC₁₀H₂₁ |
| 33 | —O—C₁₈H₃₇ | H | F | C₁₄H₂₉ | —COOC₁₈H₃₃ |
| 34 | H | —O—C₅H₁₁ | —COOCH₂Ph | C₁₆H₃₃ | COOCH₂—Ph |
| 35 | H | —OCH₃ | —COOPh | Ph—CH₂— | —COO—Ph |
| 36 | H | —O—C₁₀H₂₁ | —OCH₃ | C₆H₅— | —CO—N⟨morpholino⟩ |
| 37 | H | —O—C₁₂H₂₅ | —OC₁₀H₂₁ | C₆H₅— | —CO—N⟨piperidino⟩ |
| 38 | H | —O—C₁₈H₃₇ | —O—C₁₈H₃₇ | C₁₈H₃₇— | —CO—N⟨piperidino⟩ |
| 39 | H | —O—C₃H₇ | —CO—N⟨piperidino⟩ | ClPh— | —CONHC₁₀H₂₁ |
| 40 | H | —O—C₁₄H₂₉ | —CO—N⟨piperidino⟩ | C₂H₄Ph— | —CONHC₄HPI₆ |
| 41 | H | —O—CH₃ | —CO—N⟨morpholino⟩ | FPh— | —CONHC₁₀H₂₀Br |
| 42 | —OCH₃ | H | —CONHC₆H₁₃ | CH₃OPh— | —CONHC₂H₄OCH₃ |
| 43 | H | —OCH₃ | —CONHPh | BrPh— | —CONHR₁₇HO₃₄CH₃₅ |

3. The compound according to claim 1 having the formula:

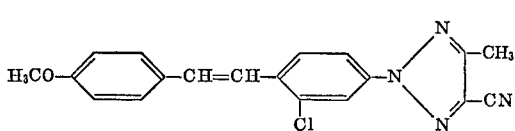

4. The compound according to claim 1 having the formula:

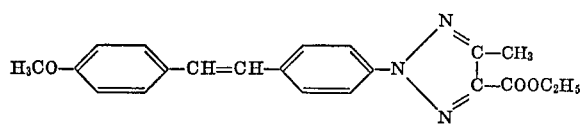

5. The compound according to claim 1 having the formula:

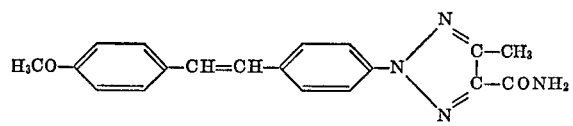

6. The compound according to claim 1 having the formula:

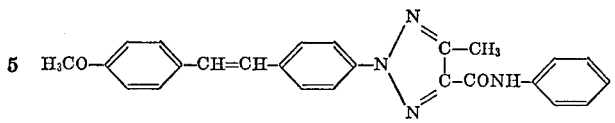

7. The compound according to claim 1 having the formula:

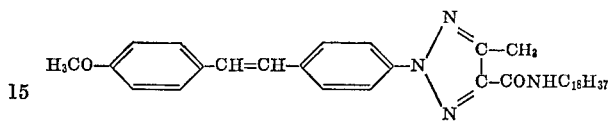

References Cited
UNITED STATES PATENTS

| | | | |
|---|---|---|---|
| 3,406,169 | 10/1968 | Cofrancesco | 260—240 C |
| 3,453,268 | 7/1969 | Dorlars et al. | 260—240 C |
| 3,459,744 | 8/1969 | Dorlars et al. | 260—240 C |

JOHN D. RANDOLPH, Primary Examiner

U.S. Cl. X.R.

117—33.5 T; 252—117, 301.2 W, 543; 260—77.5 AN, 78 R, 141, 192, 193, 247.5 R, 293.87, 465 E, 465.5; 482 R, 561 A